United States Patent [19]

Nasu et al.

[11] Patent Number: 4,942,048

[45] Date of Patent: Jul. 17, 1990

[54] PROCESS FOR PRESERVING FOOD AND DEOXYGENATING COMPOSITION

[75] Inventors: Yasunobu Nasu, Fuchu; Taichi Ogishima, Akishima; Akira Dei, Tachikawa; Haruhiko Uchida, Musashimurayama; Mitsuru Inami, Takasaki; Tatsuo Furuhashi; Yasuhiko Hino, both of Yono; Hideo Sugimura, Kita, all of Japan

[73] Assignee: Nippon Kayaku Kabushiki Kaisha, Tokyo, Japan

[21] Appl. No.: 921,689

[22] Filed: Oct. 22, 1986

[30] Foreign Application Priority Data

Oct. 29, 1985 [JP] Japan .................. 60-242240
Feb. 13, 1986 [JP] Japan .................. 61-27860

[51] Int. Cl.$^5$ ........................................ A23L 3/34
[52] U.S. Cl. .......................... 426/271; 252/181.1; 252/181.6; 252/188.28; 252/181.2; 252/181.3; 252/181.4; 252/181.5; 252/401; 426/541; 426/544; 426/654; 426/324
[58] Field of Search ............ 426/324, 541, 544; 252/188.28, 401, 181.1–181.6

[56] References Cited

U.S. PATENT DOCUMENTS 2,377,031  5/1943  Norris ........................ 426/541

FOREIGN PATENT DOCUMENTS 1109499  6/1961  Fed. Rep. of Germany .
50-80963  1/1975  Japan .
56-150433 11/1981  Japan .
226512  5/1925  United Kingdom .

OTHER PUBLICATIONS

McGraw-Hill Encyclopedia of Chemistry, Sybil Parked Ed, 1983, pp. 521-522.
CA 95(20: 171813h.
CA 96(10): 71166h.

Primary Examiner—Robert J. Warden
Assistant Examiner—Timothy M. McMahon
Attorney, Agent, or Firm—Henry C. Nields

[57] ABSTRACT

A process for preserving food which comprises packing the food in a hermetically sealed container together with:
(a) a deoxygenating material; and
(b) at least one compound having amino group(s) selected from among a basic anion exchange resin optionally substituted by a halide ion, an amino acid having one to five carbon atoms in the alkylene chain and a polyamino acid obtained by polycondensing it or a salt thereof, a powdery or granular protein, a polypeptide of a molecular weight of 500 to 20,000 obtained by hydrolyzing a protein and a polymer comprising amino sugar(s);

in such a manner that they are not in direct contact with the food. A deoxygenating composition including the components (a) and (b) as defined above is also disclosed.

8 Claims, No Drawings

PROCESS FOR PRESERVING FOOD AND DEOXYGENATING COMPOSITION

BACKGROUND OF THE INVENTION

The use of a deoxygenating agent would render anaerobic the inside of closely packed food such as noodles, rice, fish, flesh and fowl and paste products thereof, fermented food, rice cakes, Japanese-and Western-style confections and smoked food, to thereby significantly inhibit the growth of aerobic microorganisms such as molds. Since it apparently seems that the shelf life of each food product is significantly prolonged thereby, deoxygenating agents have been widely applied to a number of closely packaged foods.

Conventional deoxygenating agents are mainly composed of, for example: (a) in iron powder and a metal halide; (b) a ferrous compound and an alkaline material such as sodium acetate decahydrate, sodium sulfate decahydrate or an alkali hydroxide; (c) an organic reducing material such as ascorbic acid and an alkaline material; or (d) hydrosulfite and an alkaline material. However it has been found that there are many microorganisms capable of vigorously growing under an anaerobic condition so that no practically sufficient shelf life can be achieved only by using a deoxygenating agent in many cases. Thus we have occasionally proposed to employ ethyl alcohol, which can enhance antibacterial activities under an anaerobic condition, together with a deoxygenating agent. This process is now being widely accepted.

SUMMARY OF THE INVENTION

We have attempted to find out a material which can remove acetaldehyde without substantially inhibiting the capability of a deoxygenating agent to remove oxygen gas. As a result, we have found that a material having optionally N-substituted amino group(s), which will be referred to as a material having amino group(s) hereinbelow, is highly useful therefor.

Accordingly the present invention relates to a process for preserving food which comprises packing the food into a heremetically sealed container together with:

(a) a deoxygenating material; and (b) at least one compound having amino group(s) selected from among a basic, preferably a weakly basic, anion exchange resin optionally substituted by a halide ion, an amino acid having one to five carbon atoms in the alkylene chain and a polyamino acid obtained by polycondensing it or a salt thereof, a powdery or granular protein, a polypeptide of a molecular weight of 500 to 20,000 obtained by hydrolyzing a protein and a polymer comprising amino sugar(s); in such a manner that they are not in direct contact with the food, as well as to a deoxygenating composition which contains the deoxygenating material (a) and the compound(s) having amino group(s) (b) as essential ingredients.

The present invention aims at providing a process for protecting food from denaturation by deoxygenating the content of a hermetically sealed container without generating any aldehyde even in the presence of ethyl alcohol.

The present invention further aims at providing a deoxygenating composition suitable therefor.

The present invention furthermore aims at providing a deoxygenating composition of an elevated deoxygenating capacity.

DETAILED DESCRIPTION OF THE INVENTION

Although it was found that the combined use of ethyl alcohol and a deoxygenating agent was highly effective in prolonging the shelf life of closely packaged food as described above, subsequent studies have revealed that this method has a serious disadvantage. Namely, when the ethyl alcohol vapor is in contact with the deoxygenating agent, the former is oxidized to thereby form acetaldehyde, against conventional chemical knowledge. More precisely browning and the evolution of an offensive smell with the elpase of time are more significant in raw noodles packaged together with ethyl alcohol and a deoxygenating agent than those with the deoxygenating agent alone. Further a peak different from that of the ethyl alcohol is observed in the gas-chromatogram of a head space gas obtained from the former noodles. As a result of a model test with the use of ethyl alcohol and the deoxygenating agent, it was confirmed that the newly formed peak shows the same retention time on the chart and the same smell as those of standard acetaldehyde. Thus the formed material is identified with acetaldehyde.

The result of the Experiment A-1 suggests that oxygen gas contained in the package would oxidize the ethyl alcohol under a catalytic action of the deoxygenating agent to thereby form acetaldehyde.

EXPERIMENT A-1

Tissue paper containing 4 ml of 25 % ethyl alcohol adsorbed thereon and a commercially available deoxygenating agent containing an iron powder as a reducing material (Ageles ® FX; a product of Mitsubishi Gas Chemical Co., Ltd.), which will be referred to as the commercial deoxygenating agent hereinafter, were packed into a polypropylene bag coated with vinylidene chloride, which will be referred to as a KOP bag hereinafter, and deaerated followed by hermetical sealing. Then air or nitrogen gas in various amounts was injected into each KOP bag through a self-adhesive rubber plate (mfd. by Toray Engineering Co., Ltd.) applied on the surface of the bag in such a manner as to adjust the total amount of the gas to almost 250 ml. The concentration of oxygen gas in the gas contained in the bag was determined with an oxygen meter (Toray Zirconia Oxygen Meter LC 700 T; sample amount : 5 ml). After storing at 25° C. for a day, the loss caused by the removal of the oxygen gas was compensated with nitrogen gas to thereby adjust the total gas amount to almost 250 ml again. Then the acetaldehyde was determined by gas chromatography.

In this Experiment as well as those which will be described hereinbelow, acetaldehyde was determined under the following condition:

gas chromatograph: GC-4CM, mfd. by Shimadzu Corporation glass column: 3 mm in internal diameter and 3 m in height;

packing: Chromosorb 101;

column temperature: 170° C.;

injection temperature: 180 ° C.;

carrier gas (nitrogen gas): 40 ml/min;

hydrogen gas: 0.5 kg/cm$^2$;

air: 1.0 kg/cm$^2$, and injected sample: 2 ml.

As the result of Experiment A-1, the amount of the acetaldehyde thus formed increased in inverse proportion to the oxygen concentration in the package, as shown in Table A-1.

In the present application, the amount of acetaldehyde is expressed in terms of a relative value determined by allotting a value of 100 to the peak height due to a head space gas in a reagent bottle containing an acetaldehyde reagent to approximately ⅔ in volume at 25° C., since it is difficult to express it in an absolute value.

Since the lower limit of the determination is approximately 0.004 in the relative value, values lower than this are regarded as "undetectable".

Each figure in the following Table A-1 is this relative value.

TABLE A-1

| Injected air (ml) | Injected $N_2$ gas (ml) | $O_2$ gas con. after injection (%) | $CH_3CHO$ formed after stored at 25° C. for a day (relative value) |
| --- | --- | --- | --- |
| 0 | 250 | 1.01* | 0.010 |
| 50 | 200 | 4.86 | 0.042 |
| 100 | 150 | 8.71 | 0.096 |
| 150 | 100 | 12.56 | 0.278 |
| 200 | 50 | 16.40 | 0.505 |
| 250 | 0 | 20.25 | 0.682 |

*It was impossible to adjust the $O_2$ gas concentration to 0 in this method.

When the relative value exceeded 0.04, the offensive smell of acetaldehyde was significantly remarkable.

It has been found that the formation of acetaldehyde caused by the combined use of ethyl alcohol and a deoxygenating agent is unavoidable whichever method for the application of ethyl alcohol to food products may be employed. For example, when materials containing an effective amount of ethyl alcohol, such as denatured alcohol, liquors or fermented seasonings, are used together with food by kneading them into food, spraying them thereon, or employing carriers which keep them out of contact therewith, the ethyl alcohol would vaporize in the package and contact with the deoxygenating agent to thereby form acetaldehyde.

We have further found that the formation of acetaldehyde may be caused not only by the combined use of ethyl alcohol and a deoxygenating agent but also by the following factors.

The flavor of a food of a high enzymatic activity, such as buckwheat vermicelli (i.e. Japanese kisoba) or dried noodles, would be lowered upon preservation. Chromatographic analysis of head space gases has revealed that this is mainly due to the formation of aldehydes mainly comprising acetaldehyde.

Thus acetaldehyde, which is formed by the combined use of ethyl alcohol and a deoxygenating agent or in the case of a food of a high enzymatic activity, such as buckwheat vermicelli, not only causes browning and an offensive smell of the food but also exhibits toxicity on man.

We have studied to develop a deoxygenating agent which is not accompanied by generation of a toxic gas as mentioned above even in the presence of vaporized ethyl alcohol.

We have further studied and attempted to develop a deoxygenating composition which has a high deoxygenating ability and can be utilized in a compact form.

As a result, we have found that the combined use of a deoxygenating material with compound(s) having amino group(s), in particular at least one compound having amino groups selected from among: a weakly basic anion exchange resin optionally halogenated; an amino acid having one to five carbon atoms in the alkylene chain and a polyamino acid obtained by polycondensing the same or salt thereof; a powdery or granular protein of a molecular weight of 500 to 20,000; a polypeptide obtained by hydrolyzing a protein; and a polymer comprising amino sugar(s); makes deoxygenation without causing formation of aldehyde possible. Among these compounds, weakly basic anion exchange resins optionally halogenated are preferable from a practical viewpoint, since they would not be denatured during the utilization.

We have further found that a deoxygenating composition which includes an iron powder as the oxygenating material (a) and a halide ion-substituted basic anion exchange resin as the compound having amino group(s) (b) exhibits high deoxygenating properties and is suitable for applying in a compact form.

Any material having deoxygenating properties may be used as the deoxygenating material in the present invention without limitation. Conventionally used materials such as an iron powder, ferrous compounds, e.g., ferrous oxide or ferrous sulfate, ascorbic acid and its salts, erythorbic acid and its salts, hydroquinone compounds, e.g., hydroquinone and polymers thereof, dithionites, tannin, lignin, butylhydroxytoluene, and butylhydroxyanisole may be typically employed.

Preferable examples of the iron powder include reduced, electrolytic or sprayed ones composed of usually 10-mesh or below, preferably 50-mesh or below particles. The iron powder is not necessarily in a pure state. Namely it may be surface-treated with a solution of a metal halide such as sodium chloride or pottasium chloride to thereby enhance the deoxygenating ability. Either a powder material or a granular one prepared by molding the former is available.

The deoxygenating material may be further formulated into a composition together with powdery, granular or porous material(s) such as active carbon.

The compound having amino group(s) as used in the present invention includes a basic preferably a weakly basic, anion exchange resin optionally halogenated; an amino acid having one to five carbon atoms in the alkylene chain and a polyamino acid obtained by polycondensing it or salts thereof; a powdery or granular protein; a polypeptide of a molecular weight of 500 to 20,000 obtained by hydrolyzing a protein; and a polymer comprising amino sugar(s).

Examples of the basic anion exchange resin as mentioned above are polymer compounds, e.g., polystyrene or acrylic resins, to which a number of primary, secondary or tertiary amines amino groups, carbamino groups or the like are added and pyridine resins. Weakly, moderately and strongly basic anion exchange resins are commercially available at present. Among these resins, moderately and weakly basic ones are preferable. Examples of commercial wealky basic anion exchange resins are Amberlite ® RA-45 (a product or Rohm and Haas Company), which will be referred to as the ion exchange resin A hereinafter, Dowex ® WGR (a product of the Dow Chemical Company), which will be referred to as the ion exchange resin B hereinafter, Sumicaion ® KA850 and Sumikaion ® KA890 (both products of Sumitomo Chemical Co., Ltd.), Diaion ® WA-30 and Lewatit ® MP-62. Although most of the commercial products are fine granules (approximately 20- to 50-mesh), a powder or other forms are also available.

The halide ion-substituted basic anion exchange resin (halogenated resin) is the one wherein the anion exchange group of a basic anion exchange resin is substituted by a halide ion. It may be prepared by, for example, immersing the basic anion exchange resin in an aqueous solution of a hydrohalogenic acid such as hydrochloric, hydriodic or hydrobromic acid; or by contacting a gaseous hydrohalogenic acid with the basic anion exchange resin. A chloride ion-substituted weakly basic anion exchange resin may be converted into a bromide ion- or iodide ion-substituted one by treating the resin with an approximately 4 % aqueous solution of sodium hydroxide followed by washing to give a free material and then treating the product with hydriodic or hydrobromic acid. Further commercially available basic anion exchange resins or a so-called halogen type may be available as such as the halogenated resins to be used in the present invention.

Examples of the amino acid having one to five carbon atoms in the alkylene chain are glycine, alanine, valine, leucine, glutamic acid, lysine and arginine.

The polyamino acid includes those wherein the above amino acids are bonded with each other via a peptide bond. Either homopolymers or copolymers are available. More particularly, homopolymers such as polylysine, polyalanine, polyglutamic acid, polyglycine and polyarginine; and copolymers such as poly(alanine/glycine) and glutamic acid/γ-methylurethane copolymer may be cited. Those containing basic amino acids such as lysine or arginine as a constituent are preferable. The average molecular weight of the polyamino acid is not particularly restricted, though it is preferably within the range of approximately 6,000 to 10,000 from a practical viewpoint. Further the grain size of the same is approximately 10-mesh or below, preferably approximately 50-mesh or below and still preferably approximately 100- to approximately 250-mesh.

The salt of the above mentioned amino acid or polyamino acid is not particularly restricted. For example, salts with inorganic acids such as hydrochloride and sulfate; those with organic acids such as acetate; and those with bases such as sodium and potassium salts may be cited.

The powdery or granular protein includes powdery or granular albumen, casein and gluten. A powdery material is generally preferable. A granular one may have the same grain size as that of the polyamino acid as defined above.

The polypeptide, which is obtained by hydrolyzing a protein and has a molecular weight of approximately 500 to 20,000, includes polypeptides obtained by particularly hydrolyzing, e.g., gelatin according to the method disclosed in U.S. Pat. No. 4,042,687, for example, Byco (soluble protein; a product of Croda Inc.) and Flamix (a product of Nippon Kayaku Co., Ltd.)

The polymer comprising amino sugar(s) includes polysaccharides comprising amino sugars, such as chitin and chitosan.

When a compound having amino group(s) other than a basic anion exchange resin optionally halogenated is employed, the object of the present invention can be more effectively achieved by simultaneously employing an alkaline material such as a hydroxide, carbonate or hydrogen carbonate of an alkali metal or an alkaline earth metal, e.g., sodium carbonate, sodium hydroxide or calcium hydroxide.

A weakly basic anion exchange resin optionally halogenated is the most preferable as the compound having amino group(s), since it exhibits a high activity of aldehyde removal and may be readily handled.

The process of the present invention can be achieved by packing the deoxygenating agent and the compound(s) having amino group(s) as mentioned above, separately or altogether, in an air-permeable bag or an air-permeable container so as to be out of direct contact with a food, and further packing the resulting package together with the food wherein ethyl alcohol is optionally used in a small oxygen-permeable bag or container. When the material having amino group(s) is soluble in water, an aqueous solution thereof may be adsorbed by a filter paper and dried prior to the use.

In the process for preserving food according to the present invention, it is preferable that the deoxygenating agent and the material having amino group(s) are present together as close as possible, since some portions of the acetaldehyde formed by contact with the deoxygenating agent could not be completely removed with the material having amino group(s) and might react with the food, when the deoxygenating agent and the material having amino group(s) are present in a packaged food apart from each other. Therefore, the deoxygenating agent and the material having amino group(s) are usually used as a mixture of them. In such a case, the use of the deoxygenating composition of the present invention capable of removing acetaldehyde causes no troubles as mentioned above.

The following Experiment A-2 was carried out to determine the optimum amount of the material having amino group(s) to be used.

EXPERIMENT A-2

Various amounts of a material having amino group(s) optionally together with an alkaline material were packed in an air-permeable bag wherein one surface was made of paper while the other surface was made of polypropylene. This bag was packed in a KOP bag together with the commercially available deoxygenating agent and tissue paper impregnated with 4 ml of 25 % ethyl alcohol followed by deaeration and hermetical sealing. Then approximately 250 ml of air was injected thereinto in the same manner as the one described in Experiment A-1. After preservation at 25 ° C. for one day and for three days, the acetaldehyde in the head space gas was determined. Although a decrease in the head space gas in an amount corresponding to the volume of the removed oxygen gas was observed in each lot in the determination after preservation for one day, no compensation with nitrogen gas was made. The same will apply in Examples hereinafter.

TABLE A-2

| Material having amino group(s) | | Alkaline material | | Formed acetaldehyde (relative value) | | $O_2$ concentration |
|---|---|---|---|---|---|---|
| name | amount (g) | name | amount (g) | after 1 day | after 3 days | after 1 day |
| none | — | — | — | 0.771 | 0.786 | o |
| L-lysine hydrochloride | 0.05 | — | — | 0.606 | 0.460 | o |
| | 0.10 | — | — | 0.476 | 0.231 | o |
| | 0.15 | — | — | 0.253 | 0.091 | o |
| | 0.20 | — | — | 0.115 | 0.040 | o |
| | 0.25 | — | — | 0.028 | 0.011 | o |
| | 0.30 | — | — | 0.004 | undetectable | o |
| | 0.40 | — | — | undetectable | undetectable | o |
| | 0.50 | — | — | undetectable | undetectable | o |
| glycine | 0.05 | sodium carbonate | 0.3 | 0.531 | 0.401 | o |
| | 0.10 | | 0.3 | 0.247 | 0.133 | o |
| | 0.15 | | 0.3 | 0.103 | 0.071 | o |
| | 0.20 | | 0.3 | 0.050 | 0.015 | o |
| | 0.25 | | 0.3 | 0.026 | 0.006 | o |
| | 0.30 | | 0.3 | 0.005 | undetectable | o |
| | 0.40 | | 0.3 | undetectable | undetectable | o |
| | 0.50 | | 0.3 | undetectable | undetectable | o |
| albumen powder | 0.5 | sodium carbonate | 0.2 | 0.673 | 0.495 | o |
| | 1.0 | | 0.4 | 0.515 | 0.385 | o |
| | 1.5 | | 0.6 | 0.288 | 0.141 | o |
| | 2.0 | | 0.8 | 0.123 | 0.056 | o |
| | 2.5 | | 1.0 | 0.026 | 0.014 | o |
| | 3.0 | | 1.2 | 0.008 | undetectable | o |
| | 4.0 | | 1.4 | undetectable | undetectable | o |
| ion exchange resin A* | 0.05 | — | — | 0.387 | 0.212 | o |
| | 0.10 | — | — | 0.157 | 0.112 | o |
| | 0.15 | — | — | 0.075 | 0.027 | o |
| | 0.20 | — | — | 0.021 | undetectable | o |
| | 0.25 | — | — | 0.006 | undetectable | o |
| | 0.30 | — | — | undetectable | undetectable | o |
| | 0.40 | — | — | undetectable | undetectable | o |
| | 0.50 | — | — | undetectable | undetectable | o |

*Amberlite ® IRA-45.

The result of Experiment A-2 indicates that the use of each of 0.3 g of L-lysine hydrochloride, 0.3 g of glycine with an alkaline material, 3 g of an albumen powder with an alkaline material or 0.25 g of the ion exchange resin A enables satisfactory removal of acetaldehyde, when a standard air content of a package is assumed as 250 ml. The same test was carried out on the ion exchange resin B. Consequently a substantially similar result to that obtained by using the ion exchange resin A was obtained. Further the albumen powder was replaced by Flamix ® (a product of Nippon Kayaku Co., Ltd.). As a result, it was found that the capacity of acetaldehyde removal of this commercial product was higher than that of the albumen powder.

The amount of the acetaldehyde thus formed may depend on the content of the oxygen gas in the hermetically sealed container. Thus the amount of the material having amino group(s) can be lowered by replacing the gas in the container by nitrogen or carbon dioxide gas in sealing.

The amount of the acetaldehyde thus formed can be calculated in the following manner. Namely, when 250 ml of air is contained in a container as a standard, the air contains almost 2 mM of oxygen gas. This oxygen gas can oxidize 4 mM, i.e., approximately 200 mg of ethyl alcohol at most to thereby form approximately the same amount of acetaldehyde. A packaged food usually contains air in an amount much smaller than 250 ml and ethyl alcohol is usually employed in an amount much larger than 200 mg (1 % by weight or more of ethyl alcohol is frequently employed in food, i.e., 100 g of food contains 1000 mg or more of the same). Therefore the decrease in the shelf life of food caused by the loss of ethyl alcohol is nothing to worry about.

When the content of a sealed container is to be deoxygenated by the process of the present invention, the amounts of the deoxygenating material and the compound(s) having amino group(s) may vary depending on each material. Thus it is required to previously determine the optimum amount of each material. Usually 0.02 g to 4 g, preferably 0.05 g to 2 g, of a deoxygenating material and 0.02 g to 10 g, preferably 0.2 g to 5 g of compound(s) having amino group(s) are used per 100 ml of air.

To further illustrate the process of the present invention, the following Examples will be given.

EXAMPLE A-1

130 g of raw Japanese noodles (udon) containing 1.5 % by weight of ethyl alcohol, which was produced in a conventional manner except using ethyl alcohol, were packed in a KOP bag together with the commercially available deoxygenating agent and the bag was hermetically sealed in such a manner as to contain almost 200 ml of air (control lot). In test lots, the same procedure as described above was carried out except that "0.3 g of L-lysine hydrochloride (No. 1)", "a mixture of 0.3 g of glycine with 0.3 g of sodium carbonate (No. 2)", "a mixture of 3 g of an albumen powder with 1 g of potassium carbonate (No. 3)" and "0.3 g of the ion exchange resin A (No. 4)", each packed in an air-permeable bag, were present together respectively.

Noodles in each package were preserved at 18 ° C. and the acetaldehyde contained in the head space gas was determined with the lapse of time. Table A-3 shows the result.

TABLE A-3

| Lot | Preservation period | | |
|---|---|---|---|
| | 1 day | 2 days | 3 days |
| Control Test | 0.254 | 0.214 | 0.072 |
| No. 1 | undetectable | undetectable | undetectable |
| No. 2 | " | " | " |
| No. 3 | " | " | " |
| No. 4 | " | " | " |

Table A-3 obviously shows that the formation of acetaldehyde was observed in the control lot while no acetaldehyde was detected in the test lots (No. 1 to No. 4).

The degree of browning, smell and general viable count of each noodle were determined after preserving the same for seven days. As a result, the control lot showed obvious browning while the test lots No. 1 to No. 4 maintained almost the same condition as that immediately after the production. The control lot exhibited an obvious smell of acetaldehyde while the test lots No. 1 to No. 4 had no smell. Each of the control and test Lots (No. 1 to No. 4) showed a sufficiently low general viable count, i.e., less than 300/g.

EXAMPLE A-2

120 g of raw Chinese noodles containing 1.2 % by weight of ethyl alcohol, which were produced in a conventional manner except using ethyl alcohol, were packed in a KOP bag together with the commercially available deoxygenating agent and the bag was hermetically sealed in such a manner as to contain approximately 200 ml of air. In test lots, the same procecure as described above was carried out except that "a mixture of 0.4 g of L-arginine with 0.5 g of kieselguhr No. 1)" and "0.3 g of the ion exchange resin B (No. 2)", each packed in an air-permeable bag, were present together respectively.

Noodles in each package were preserved at 25 ° C. and acetaldehyde in the head space gas was determined with the lapse of time. Table A-4 shows the result.

TABLE A-4

| Lot | Preservation period | | |
|---|---|---|---|
| | 1 day | 2 days | 3 days |
| Control Test | 0.142 | 0.07 | undetectable |
| No. 1 | undetectable | undetectable | " |
| No. 2 | " | " | " |

Unlike the case of Japanese raw noodles as shown in Example A-1, the acetaldehyde detected in the control lot of the present examination after preserving the noodles for one day decreased thereafter. No aldehyde was observed after preserving the same for seven days. This fact suggests that the acetaldehyde once formed might react with some components in the raw Chinese noodles and disappear thereby. This suggestion is supported by the fact that reddish browning proceeded with the lapse of time even in the control lot.

Neither acetaldehyde formation nor reddish browning was observed in the test lots No. 1 and No. 2.

EXAMPLE A-3

Approximately 2 ml of 95 % ethyl alcohol was uniformly sprayed on a piece of commercially available sponge cake, which was then packed in a KOP bag together with the commercially available deoxygenating agent and the bag was hermetically sealed in such a manner as to contain approximately 50 ml of air (control lot). In a test lot, the same procedure as the one described above was carried out except that 0.2 g of the ion exchange resin B packed in an air-permeable bag was present together.

The sponge cake in each package was preserved at 30 ° C. for two days and acetaldehyde in the head space gas was determined by gas chromatography. As a result, acetaldehyde of 0.361 in relative value was detected in the control lot while none was observed in the test lot.

EXAMPLE A-4

A piece of commercially available cake, Savarin, which weighed approximately 120 g and contained a significantly large amount of liquor, packed in a polyethylene bag having a number of pinholes was again packed in a KOP bag. A control deoxygenating agent (A) as prepared in Example A-11 as will be described hereinbelow was introduced into a space between the internal and external bags. Then the external bag was hermetically sealed in such a manner as to contain approximately 200 ml of air (control lot). In test losts, the deoxygenating agent used in the control lot was replaced by deoxygenating compositions (No. 1 to No. 7) prepared in Example A-11 as will be described hereinbelow.

The Savarin in each package was preserved at 10 ° C. for three days and acetaldehyde in the head space gas was determined. As a result, aldehyde of 0.205 in relative value was detected in the control lot, while none was observed in each test lot.

EXAMPLE A-5

Approximately 5 ml of 95 % ethyl alcohol was uniformly sprayed on ten pieces of commercially available rice cake (mochi) weighing approximately 500 g. Then the rice cake pieces were packed in a bag made of laminated films of vinylidene chloride-coated nylon and polyethylene together with the control deoxygenating agent (B) prepared in Example A-11 as will be described hereinbelow. Then the bag was hermetically sealed in such a manner as to contain approximately 300 ml of air (control air). In test lots, the deoxygenating agent used in the control lot was replaced by deoxygenating compositions (No. 8 to No. 10) prepared in Example A-11 as will be described hereinbelow.

The rice cake pieces in each package was preserved at 25 ° C. and acetaldehyde in the head space gas was determined after two and ten days. As a result, acetaldehyde of 0.413 and 0.252 in relative values was detected in the control lot after two and ten days respectively, while none was observed in each test lot.

The procedure of this Example was followed except that nearly a half of the air contained in each bag was replaced with nitrogen gas. The result thus obtained was roughly similar to that as mentioned above. However the amount of the acetaldehyde formed in the control lot was somewhat smaller than that of the above case.

EXAMPLE A-6

Approximately 3 ml of a fermented flavoring containing about 50 % of ethyl alcohol was uniformly sprayed on three pieces of commercially available inarizushi (flavored rice wrapped with fried bean curd) weighing approximately 230 g. Then the inarizushi pieces were packed into a polyethylene bag and the bag was intermittently sealed. This bag was further packed in a KOP bag together with the commercially available deoxygenating agent and the bag was hermetically sealed in such a manner as to contain approximately 150 ml of air (control lot). In a test lot, the commercially available deoxygenating agent was replaced by said deoxygenating agent with 0.2 g of the ion exchange resin A.

The inarizushi pieces in each package were preserved at 20° C. for one day and acetaldehyde in the head space gas was determined. As a result, acetaldehyde of 0.150 in relative value was detected in the control lot, while none was observed in the test lot.

EXAMPLE A-7

Ten pieces of commercially available kamaboko (a fish paste product) were placed side by side in a tray pack and packed in a KOP bag together with 1 g of a commercially available preserving agent (silica containing ethyl alcohol) (a product of Nippon Kayaku Co., Ltd.) and the control deoxygenating agent (A) prepared in Example A-11 as will be described hereinbelow. The bag was hermetically sealed in such a manner as to contain approximately 100 ml of air (control lot). In a test lot, said deoxygenating agent was replaced by the deoxygenating composition (No. 1) prepared in Example A-11 as will be described hereinbelow.

The kamaboko pieces in each package were preserved at 10° C. for three days and acetaldehyde in the head space gas was determined. As a result, acetaldehyde of 0.136 in relative value was detected in the control lot, while none was observed in the test lot.

EXAMPLE A-8

2 ml of 95 % ethyl alcohol was kneaded into 100 g of commercially available miso (fermented soybean paste) and the mixture was packed in a polypropylene bag, which was then intermittently sealed. Then it was packed in a KOP bag together with the control deoxygenating agent (B) prepared in Example A-11 as will be described hereinbelow and the bag was hermetically sealed in such a manner as to contain approximately 50 ml of air (control lot). In a test lot, said deoxygenating agent was replaced with the deoxygenating composition (No. 8) prepared in Example A-11 as will be described hereinbelow.

The miso in each package was preserved at 15° C. for three days and acetaldehyde in the head space gas was determined. As a result, acetaldehyde of 0.163 in relative value was detected in the control lot, while none was observed in the test lot.

EXAMPLE A-9

1.5 ml of 95 % ethyl alcohol was kneaded into 100 g of commercially available sugared nerian (bean jam). Then the same procedure as described in Example A-8 was performed. Acetaldehyde of 0.122 in relative value was detected in the control lot, while none was observed in the test lot.

EXAMPLE A-10

120 g of buckwheat vermicelli (kisoba) produced in a conventional manner without using any ethyl alcohol was packed in a KOP bag together with the commercially available deoxygenating agent alone (control lot) or together with 0.2 g of the ion exchange resin B (test lot), and the bag was hermetically sealed in such a manner as to contain approximately 50 ml of air.

The buckwheat vermicelli in each package was preserved at 20° C. for three days and acetaldehyde in the head space gas was determined. Further the smell of the content was evaluated after opening the bag. As a result, acetaldehyde of 0.035 in relative value was detected and an offensive smell was noticed in the control lot, while no aldehyde and a significantly lower offensive smell were noticed in the test lot.

Now the deoxygenating composition of the present invention will be described in more detail.

The deoxygenating composition of the present invention is characterized by including:

(a) a deoxygenating material; and (b) at least one compound having amino group(s) selected from among a basic, preferably a weakly basic, anion exchange resin optionally halogenated, an amino acid having one to five carbon atoms in the alkylene chain and a polyamino acid obtained by polycondensing it or salts thereof, a powdery or granular protein, a polypeptide of 500 to 20,000 in molecular weight obtained by hydrolyzing a protein and a polymer comprising amino sugar(s).

The ratio of the deoxygenating material (a) to the compound(s) having amino group(s) (b) in the deoxygenating composition of the present invention may vary depending on the components (a) and (b) to be employed. Generally approximately 0.02 to approximately 100 parts by weight, preferably approximately 0.05 to approximately 40 parts by weight, of the material having amino group(s) (b) is employed per 10 parts by weight of the deoxygenating material (a).

In addition to the components (a) and (b) as defined above, the deoxygenating composition of the present invention may further contain fillers such as silica gel and carbon and/or adjuvants such as alkali halides, e.g., common salt and alkaline materials as described above. The amount of these additives is not strictly limited, but it is generally preferable not to exceed approximately 100 parts by weight.

Accordingly, the composition of the present invention comprises:

(a) approximately 10 to approximately 99.8 parts by weight of a deoxygenating material;

(b) approximately 0.2 to approximately 90 parts by weight of compound(s) having amino group(s); and (c) 0 to approximately 88.8 parts by weight of adjuvant(s) and/or filler(s).

More preferably, it comprises: approximately 20 to approximately 99.5 parts by weight of the component (a); approximately 0.5 to approximately 80 parts by weight of the component (b); and 0 to approximately 79.5 parts by weight of the component (c).

All of the materials cited above are available as the deoxygenating material (a) and the compound(s) having amino group(s) (b) in the present invention.

Among these materials, preferable examples of the deoxygenating material (a) include an iron powder, ferrous compounds and ascorbic acid and salts thereof, while preferable examples of the compound(s) having amino group(s) (b) include weakly basic anion exchange resins optionally halogenated, amino acids having one to five carbon atoms in the alkylene chain and polyamino acids obtained by polycondensing them or salts thereof and polyaminosaccharides.

It is further preferable to use an iron powder as the component (a) together with a weakly basic anion exchange resin optionally halogenated as the component (b).

In this case, it is preferable to blend:

(a) approximately 50 to approximately 99.5 parts by weight, preferably approximately 80 to approximately 99 parts by weight, of the iron powder; with (b) approximately 0.5 to approximately 50 parts by weight, preferably approximately 1 to approximately 20 parts by weight, of a weakly basic anion exchange resin and/or a resin obtained by halogenating it.

A halogenated resin may be used alone as the component (b). However it is preferable to use a halogenated resin together with a weakly basic anion exchange resin or to use a resin halogenated resin having free (i.e. substituted with no halide ion) anion exchange group(s) (partially halogenated resin), when the composition is used simultaneously with ethyl alcohol or applied to a food containing ethyl alcohol.

A partially halogenated resin wherein some portion of anion exchange groups is substituted with a halide ion may be obtained by previously determining the maximum ratio of the resin to be substituted with a halide ion and treating the resin with, for example, a hydrohalogenic acid in an amount enough to obtain the desired substitution ratio based on the above data.

When the halogenated resin obtained through the treatment with, for example, a hydrohalogenic acid exhibits some residual smell of this acid, it is further washed with water. Then the excessive moisture, if any, is removed by, for example, air-drying or centrifusing and the resin is dried with, for example, hot air if required. The halogenated resin, which is substituted with a halide ion at a ratio of 100 % unless otherwise noted, would cause no obstacle to the achievement of the objects of the present invention, even when dried at approximately 105° C. until no weight loss is observed. Since the halogenated resin is so stable, the moisture content thereof may be controlled by adding a predetermined amount of water thereto after drying.

The moisture content of the halogenated resin in the stage of removing the excessive moisture following the washing stage varies from 40 to 70 % depending on the type of the basic anion exchange resin. The resin of such a moisture content or below is relatively free-flowing and may be appropriately mixed with an iron powder or compactly packaged. Further the deoxygenating rate and the dependance on environmental temperature of the halogenated resin may vary depending on the moisture content thereof. Therefore deoxygenating agents of a self-reaction expediting type independent from environmental humidity, an environmental humidity-depending type and an intermediate type between these two types can be prepared by simply controlling the moisture content of the halogenated resin.

In addition, the deoxygenating rate would generally decrease with a decrease in the substitution ratio of the halogenated resin in a given amount, although some variations are observed depending on the amount of the halogenated resin.

The deoxygenating rate of the composition of the present invention may further vary depending on the grain size of the halogenated resin. Thus a commercially available fine granule may be employed as such, but it is preferable to grind the same before or after the treatment with a hydrohalogenic acid. The deoxygenating rate of the deoxygenating agent would increase with a decrease in the grain size. However a grain size of approximately 250-mesh or below may sometimes result in setting of the deoxygenating agent as the reaction proceeds, which inhibits the deoxygenating reaction thereafter. This trouble may be solved by controlling the moisture content of the halogenated resin or the moisture content and activity of the food to which the deoxygenating agent is applied.

The same effect may be achieved by mixing a weakly basic anion exchange resin and a halogenated resin at an appropriate ratio to thereby control the ratio of the free anion exchange groups to the halide ion-substituted anion exchange groups.

The basic anion exchange resin and the halogenated resin including a partially halogenated resin to be used in the present invention are usually employed in a powdery or granular form of a grain size of generally approximately 10-mesh or above, preferably approximately 15- to more preferably approximately/20-250-mesh or 270-mesh.

The composition of the present invention may be prepared by usually mixing the deoxygenating material (a) and the compound(s) having amino group(s) (b) together with adjuvant(s) and/or filler(s) if required; and packing the obtained mixture in a known air-permeable bag or container to thereby provide a composition in a compactly packaged form in use.

The obtained mixture may be formulated into, for example, tablets in a known manner. Further the two components or a mixture thereof may be laminated on, for example, a sheet.

When deoxygenation is performed with the use of the composition of the present invention comprising an iron powder as the component (a) and a halogenated resin as the component (b), the amount of use thereof may be appropriately determined by referring to the following description.

For example, approximately 0.2 g of the iron powder is required for removing oxygen gas contained in 250 ml of air. Approximately 0.15 g of the halogenated resin is required under the optimum condition to attain the maximum deoxygenating power of the iron powder. However the amount of the halogenated resin may be decreased by increasing the amount of the iron powder.

When the deoxygenating composition of the present invention is of a self-reaction expediting type showing a high reaction rate, it is desirable to perform the mixing of the deoxygenating material (a) with the compound(s) having amino group(s) and the packaging of the same in an atmosphere of an inert gas such as nitrogen gas.

To further illustrate the deoxygenating composition of the present invention, the following Examples will be given.

EXAMPLE A-11: COMPOSITION

Deoxygenating compositions (No. 1 to No. 13) according to the present invention were prepared by mixing the deoxygenating agents A, B or C as shown in Table A-5-1 with the seven materials having amino group(s) as shown in Table A-5-2 at the ratios as shown in Table A-5-3 (left) and packing each mixture in an air-permeable bag. The blending was carried out either by homogenous mixing when both components were powders or by alternately laminating the components when either or both of them were adsorbed each by filter paper.

The capacities of removing acetaldehyde of the deoxygenating compositions No. 1 to No. 13 according to the present invention and control deoxygenating agents A to C obtained through conventional techniques were determined. Namely, each deoxygenating composition or deoxygenating agent was packed in a KOP bag together with tissue paper containing 4 ml of 25 % ethyl alcohol adsorbed thereon and the bag was hermetically sealed in such a manner as to contain approximately 250 ml of air. Each KOP bag was preserved at 25 ° C. and acetaldehyde in the head space gas was determined with the lapse of time. Table A-5-3 shows the result.

TABLE A-5-1

| Symbol | Preparation of deoxygenating agent |
|---|---|
| A | 2 g of a mixture obtained by blending 100 g of an electrolytic iron powder with 2 ml of a saturated aqueous solution of common salt followed by drying in vacuo. |
| B | 3 g of a mixture obtained by blending 100 g of a reduced iron powder with 10 ml of a 2% aqueous solution of common salt and 5 g of a silica gel powder. |
| C | Two sheets of filter paper (Toyo Roshi No. 2; 12.5 cm in diameter) are immersed in saturated aqueous solutions of sodium ascorbate and ferrous sulfate, respectively, and taken out therefrom followed by drying. These two sheets were cut into each eight pieces and alternately laminated on each other followed by pressing. |

TABLE A-5-2

| Symbol | Material having amino group(s) or preparation thereof |
|---|---|
| a | 0.3 g of ion exchange resin A |
| b | 0.3 g of ion exchange resin B |
| c | mixture of 0.4 g of L-lysine hydrochloride with 0.2 g of powdery silica gel |
| d | mixture of 0.3 g of glycine with 0.2 g of sodium carbonate |
| e | mixture of 0.4 g of L-arginine with 0.2 g of powdery silica gel |
| f | mixture of 3 g of albumen with 1 g of sodium carbonate |
| g | filter paper (Toyo Roshi No. 2, 12.5 cm in diameter) immersed in a saturated aqueous solution of L-lysine hydrochloride, taken out therefrom, dried and cut into eight pieces |

TABLE A-5-3

| Deoxygenating composition of invention No. | Combination* | Formed acetaldehyde | | | |
|---|---|---|---|---|---|
| | | after 1 day | after 2 days | after 10 days | after 30 days |
| 1 | A-a | undetectable | undetectable | undetectable | undetectable |
| 2 | A-b | undetectable | undetectable | undetectable | undetectable |
| 3 | A-c | undetectable | undetectable | undetectable | undetectable |
| 4 | A-d | undetectable | undetectable | undetectable | undetectable |
| 5 | A-e | 0.011 | undetectable | 0.005 | undetectable |
| 6 | A-f | 0.025 | 0.007 | 0.008 | undetectable |
| 7 | A-g | 0.005 | undetectable | undetectable | undetectable |
| 8 | B-a | undetectable | undetectable | undetectable | undetectable |
| 9 | B-c | undetectable | undetectable | undetectable | undetectable |
| 10 | B-f | 0.005 | 0.011 | undetectable | undetectable |
| 11 | C-a | undetectable | undetectable | undetectable | undetectable |
| 12 | C-e | undetectable | 0.005 | undetectable | undetectable |
| 13 | C-f | 0.010 | 0.005 | undetectable | undetectable |
| Control lot | | | | | |
| A | A alone | 0.961 | 1.030 | 0.922 | 0.814 |
| B | B alone | 0.708 | 0.693 | 0.771 | 0.712 |
| C | C alone | 0.314 | 0.330 | 0.293 | 0.261 |

*A to C represent each the deoxygenating agent as shown in TABLE A-5-1 while a to g represent each the material having amino group(s) as shown in Table A-5-2.

As shown in Table A-5-3, every deoxygenating composition of the present invention (No. 1 to No. 13) exhibited a high capacity of removing acetaldehyde.

Further the capacities of removing oxygen of the abovementioned 13 deoxygenating compositions and the three control deoxygenating agents (A to C) were examined. Each deoxygenating composition or agent contained in a small bag was packed in a KOP bag together with a small piece of moistened filter paper and the bag was hermetically sealed in such a manner as to contain approximately 250 ml of air. Then it was preserved at 25 ° C. for one day and the concentration of oxygen gas in the head space gas was determined with an oxygen meter. As a result, each deoxygenating composition according to the present invention exhibited a practically similar capacity of removing oxygen to those of control deoxygenating agents, i.e., the oxygen concentration was within a range of 0.000 to 0.001 % in every case.

EXAMPLE A-12: COMPOSITION

Deoxygenating compositions according to the present invention were prepared by blending the commercially available deoxygenating agent with 0.1 to 0.5 g of the ion exchange resin A.

The capacities of removing oxygen of the deoxygenating compositions thus obtained were determined in the same manner as the one described in Example A-11. As a result, it was found that the capacities of removing oxygen of the deoxygenating compositions were not different from that of the commercial deoxygenating agent. On the other hand, the capacities of removing acetaldehyde were significantly high in the deoxygenating compositions containing 0.2 g or more of the ion exchange resin A, i.e., containing 0.1 g or more of the ion exchange resin A when 100 ml of air was contained in the KOP bag.

EXPERIMENT B-1: EXAMPLES B-1 TO B-18

Effect of the type of basic anion exchange resin or hydrohalogenic acid:

The following commercial basic anion exchange resins were employed. Among these resins, chlorinetype ones had been previously converted into free-type by treating them with sodium hydroxide.

Amberlite ® IRA-45, abbreviated as IRA- ®45 hereinafter, a product of Rohm and Haas Company, weakly basic anion exchange resin, free type;

Amberlite ®IRA-68, abbreviated as IRA-68 hereinafter, moderatedly basic anion exchange resin, free type;

Amberlite ®IRA-400, abbreviated as IRA-400 hereinafter strongly basic anion exchange resin, chlorine type;

Dowex ®WGR-2, abbreviated as WGR-2 hereinafter, a product of The Dow Chemical Company, weakly basic anion exchange resin, chlorine type;

Dowex ®MSA-1, abbreviated as MSA-1 hereinafter, strongly basic anion exchange resin, chlorine type; and Muromac ®A-7, abbreviated as A-7 hereinafter, a product of Muromachi Chemical Industry Co., Ltd., weakly basic anion exchange resin, chlorine type.

To 100 parts by weight of each basic anion exchange resin, 150 parts by weight of a 10 % aqueous solution of hydrochloric acid (HCl), hydrobromic acid (HBr) or hydriodic acid (HI) was added. The obtained mixture was then washed with water several times to thereby remove any offensive smell.

Then the excessive moisture was wiped away with gauze to thereby give six halogenated resins. 0.4 g of each halogenated resin was mixed with 0.25 g of an electrolytic iron powder and packed in an air-permeable bag wherein one side was made of paper and the other side polyethylene. Thus 18 deoxygenating compositions of the present invention were prepared.

The efficiency of each deoxygenating composition was evaluated under the following conditions. Test of a self-reaction expediting type:

A deoxygenating composition was packed in a vinylidene chloride coated-polypropylene bag, which will be abbreviated as a KOP bag hereinafter, and the bag was hermetically sealed under deaerating. Then air was injected thereinto via a self-adhesive rubber plate (mfd. by Toray Engineering Co., Ltd.) applied on the surface of the KOP bag to a total content of air in the bag of about 250 ml. This package was preserved at 25 ° C. and the oxygen gas concentration in the bag was determined with the lapse of time with an oxygen meter (Tory Zirconia Oxygen Meter LCt00T; sample amount: 5 ml). Test of an environmental humidity-depending type:

The procedure of the above-described test was followed except that tissue paper containing 4 ml of water adsorbed thereon was packed in the KOP bag as a moisture source.

Unless otherwise noted, the tests of a self-reaction expediting type and an environmental humidity-depending type were carried out hereinbelow under the above specified conditions.

Table B-1 shows the result of the above experiment.

Table B-1 obviously indicates that the efficiencies of the deoxygenating compositions of the present invention are hardly affected by the hydrohalogenic acids. It is assumed that hydrofluoric acid might give a similar effect. However it was not employed in the present invention since it is preferable not to use this acid, which is highly dangerous to handle, in the field. Among the basic anion exchange resins, weakly and moderately basic ones are superior to strongly basic ones. However both of the oxygen concentration in the bags containing IRA-400 and MSA-1, which are strongly basic anion exchange resins, and preserved for 72 hours are 0.000 %, which suggests that the deoxygenating capacities of these resins are sufficient under this condition although the deoxygenating proceeded slowly.

The results of the rest of an environmental humidity-depending type is moisted here since it is practically similar to that as shown in Table B-1.

TABLE B-1

| Test of a self-reaction expediting type | | | | |
|---|---|---|---|---|
| Deoxygenating agent (Example No.) | Ion exchange resin | Hydrohalogenic acid | $O_2$ gas conc. (%) after 15 hr | after 22 hr |
| B-1 | IRA-45 | HCl | 0.062 | 0.000 |
| B-2 | " | HBr | 0.091 | 0.000 |
| B-3 | " | HI | 0.085 | 0.000 |
| B-4 | IRA-68 | HCl | 0.052 | 0.000 |
| B-5 | " | HBr | 0.083 | 0.000 |
| B-6 | " | HI | 0.063 | 0.000 |
| B-7 | IRA-400 | HCl | 1.24 | 0.085 |
| B-8 | " | HBr | 3.12 | 0.230 |
| B-9 | " | HI | 2.11 | 0.152 |
| B-10 | WGR-2 | HCl | 0.081 | 0.000 |
| B-11 | " | HBr | 0.135 | 0.000 |
| B-12 | " | HI | 0.114 | 0.000 |
| B-13 | MSA-1 | HCl | 11.4 | 4.25 |
| B-14 | " | HBr | 13.2 | 6.21 |
| B-15 | " | HI | 10.4 | 5.11 |
| B-16 | A-7 | HCl | 0.167 | 0.000 |
| B-17 | " | HBr | 0.094 | 0.000 |
| B-18 | " | HI | 0.211 | 0.000 |

EXPERIMENT B-2: EXAMPLES B-19 TO B-39

Effect of moisture content of halogenated resin

To 100 parts by weight of IRA-45 or IRA-68, 150 parts by weight of a 10 % aqueous solution of hydrochloric acid was added. Then each mixture was stirred and washed with water several times to thereby remove any offensive smell. After draining, the mixture was dried at 105 ° C. for approximately three hours to thereby give a dry halogenated resin, which was referred to as an anhydrate. A-7 was dried at 105 ° C. for approximately three hours without any pretreatment to thereby give a dry halogenated resin. To 0.2 g of each resin, water was added to give a moisture content of 0 to 60 %. Then the resin was packed in an air-permeable bag together with 0.25 % of an electrolytic iron powder to thereby give 21 deoxygenating compositions of the present invention as shown in Table B-2.

These deoxygenating compositions thus obtained were subjected to the tests of a self-reaction expediting type and environmental humidity-depending type. Tables B-3 and B-4 show the results.

TABLE B-2

| Deoxygenating composition (Example No.) | Ion exchange resin | Moisture content of halogenated resin (%) |
|---|---|---|
| B-19 | IRA-45 | 0 |
| B-20 | " | 10 |
| B-21 | " | 20 |
| B-22 | " | 30 |
| B-23 | " | 40 |
| B-24 | " | 50 |
| B-25 | " | 60 |
| B-26 | IRA-68 | 0 |
| B-27 | " | 10 |
| B-28 | " | 20 |
| B-29 | " | 30 |
| B-30 | " | 40 |
| B-31 | " | 50 |
| B-32 | " | 60 |
| B-33 | A-7 | 0 |
| B-34 | " | 10 |
| B-35 | " | 20 |
| B-36 | " | 30 |
| B-37 | " | 40 |
| B-38 | " | 50 |
| B-39 | " | 60 |

TABLE B-3

Test of a self-reaction expediting type

| Deoxygenating composition (Example No.) | $O_2$ gas concentration (%) | | |
|---|---|---|---|
| | after 2 hr | after 24 hr | after 45 hr |
| B-19 | 20.2 | 20.1 | 20.2 |
| B-20 | 19.4 | 18.7 | 18.6 |
| B-21 | 19.5 | 18.1 | 15.3 |
| B-22 | 19.2 | 4.54 | 2.52 |
| B-23 | 19.4 | 0.014 | 0.000 |
| B-24 | 19.3 | 0.000 | 0.000 |
| B-25 | 18.6 | 0.000 | 0.000 |
| B-26 | 20.1 | 20.0 | 20.0 |
| B-27 | 19.7 | 19.8 | 18.6 |
| B-28 | 19.7 | 18.6 | 18.7 |
| B-29 | 18.2 | 17.2 | 14.3 |
| B-30 | 19.4 | 5.6 | 0.023 |
| B-31 | 18.3 | 0.000 | 0.000 |
| B-32 | 17.9 | 0.000 | 0.000 |
| B-33 | 20.0 | 20.0 | 20.1 |
| B-34 | 19.7 | 19.1 | 18.7 |
| B-35 | 19.7 | 18.3 | 16.2 |
| B-36 | 19.4 | 12.4 | 5.1 |
| B-37 | 19.6 | 8.8 | 0.163 |
| B-38 | 18.9 | 0.007 | 0.000 |
| B-39 | 17.7 | 0.000 | 0.000 |

TABLE B-4

Test of an environmental humidity-depending type

| Deoxygenating composition (Example No.) | $O_2$ gas concentration (%) | | |
|---|---|---|---|
| | after 7 hr | after 24 hr | after 96 hr |
| B-19 | 19.7 | 5.7 | 0.000 |
| B-20 | 19.2 | 4.85 | 0.000 |
| B-21 | 18.1 | 1.99 | 0.000 |
| B-22 | 14.0 | 0.035 | 0.000 |
| B-23 | 11.0 | 0.000 | — |
| B-24 | 8.4 | 0.000 | — |
| B-25 | 3.10 | 0.000 | — |
| B-26 | 19.9 | 6.4 | 0.000 |
| B-27 | 19.8 | 5.6 | 0.000 |
| B-28 | 17.6 | 2.01 | 0.000 |
| B-29 | 12.1 | 0.005 | 0.000 |
| B-30 | 8.6 | 0.000 | — |
| B-31 | 7.7 | 0.000 | — |
| B-32 | 1.65 | 0.000 | — |
| B-33 | 20.1 | 16.8 | 0.012 |
| B-34 | 19.7 | 11.3 | 0.000 |
| B-35 | 18.3 | 0.145 | 0.000 |
| B-36 | 13.6 | 0.005 | 0.000 |
| B-37 | 15.2 | 0.000 | — |
| B-38 | 11.4 | 0.000 | — |
| B-39 | 10.2 | 0.000 | — |

Tables B-3 and B-4 indicate that the deoxygenating composition of, for example, Example B-19 shows no reaction in the absence of a sufficient moisture source but can completely remove oxygen gas in the presence thereof at last.

EXPERIMENT B-3: EXAMPLES B-40 to B-44

Effect of the grain size of halogenated resin:

A dry halogenated resin was prepared from IRA-45 in the same manner as the one described in Experiment B-2. This dry material was appropriately ground and fractionated depending on the grain size by passing the same through seives. Water was added to 0.2 g of the halogenated resin of each grain size to thereby give a moisture content of 50 % and the mixture was packed in an air-permeable bag together with 0.25 g of a reduced iron powder to thereby give five deoxygenating compositions of the present invention.

Each deoxygenating composition thus obtained was then subjected to the test of a self-reaction expediting type. Table B-5 shows the result.

Table B-5 indicates that the deoxygenation rate would increase with a decrease in the grain size of a halogenated resin.

TABLE B-5

Test of a self-reaction expediting type

| Deoxygenating composition (Example No.) | Grain size of halogenated resin (mesh) | $O_2$ gas conc. (%) | |
|---|---|---|---|
| | | after 7 hr | after 23 hr |
| B-40 | <35 | 10.2 | 0.354 |
| B-41 | 35~60 | 7.3 | 0.045 |
| B-42 | 60~100 | 5.1 | 0.000 |
| B-43 | 100~200 | 2.45 | 0.000 |
| B-44 | >200 | 3.16 | 0.000 |

Experiment B-4: EXAMPLES B-45 to B-49

Effect of the degree of halide iron substitution of halogenated resiN

Dry halogenated resins different in the degree of halogen ion substitution, which will be referred to as the halogen content hereinafter, from each other were prepared by adding 150 parts by weight of a 10 % aqueous solution of hydrochloric acid or 150 to 2000 parts by weight of a 1/10 N aqueous solution of hydrochloric acid to 100 parts by weight of IRA-45 and stirring, draining and drying each mixture at 105 ° C.

The halogen content of each resin was determined by titrating the chloride ion removed from the halogenated resin with potassium nitrate and expressed in a molar number per kg of the dry IRA-45. The halogen content of the halogenated resin prepared with the use of the 10 % aqueous solution of hydrochloric acid showed little change with an increase in the amount of the hydrochloric acid. Thus the halogen content of this resin was regarded as 100 % and those of other resins were evaluated therefrom.

Water was added to 0.2 g of each dry halogenated resin to thereby give a moisture content of 50 %. Then the mixture was packed in an air-permeable bag together with 0.25 g of an electrolytic iron powder to thereby give five deoxygenating compositions of the present invention (cf. Table B-6).

TABLE B-6

| Deoxygenating composition (Example No.) | Halogen content of halogenated resin | |
|---|---|---|
| | mole/kg | halogenation ratio (%) |
| B-45 | 5.18 | 100 |
| B-46 | 3.41 | 65.8 |
| B-47 | 1.63 | 31.4 |
| B-48 | 1.14 | 22.1 |
| B-49 | 0.52 | 10.1 |
| Referential example | 0.27 | 5.2 |

Each deoxygenating composition thus obtained was subjected to the tests of both a self-reaction expediting type and environmental humidity-depending type. Tables B-7 and B-8 show the results.

TABLE B-7

| Test of a self-reaction expediting type | | | |
|---|---|---|---|
| Deoxygenating composition | $O_2$ gas concentration (%) | | |
| (Example No.) | after 7 hr | after 24 hr | after 48 hr |
| B-45 | 8.2 | 0.000 | 0.000 |
| B-46 | 7.9 | 0.004 | 0.000 |
| B-47 | 14.6 | 0.015 | 0.000 |
| B-48 | 16.5 | 1.24 | 0.000 |
| B-49 | 17.0 | 6.2 | 0.243 |
| Referential example | 18.6 | 12.1 | 10.8 |

TABLE B-8

| Test of an environmental humidity-depending type | | | |
|---|---|---|---|
| Deoxygenating composition | $O_2$ gas concentration (%) | | |
| (Example No.) | after 7 hr | after 24 hr | after 48 hr |
| B-45 | 6.2 | 0.000 | 0.000 |
| B-46 | 7.3 | 0.000 | 0.000 |
| B-47 | 12.3 | 0.124 | 0.000 |
| B-48 | 16.7 | 0.248 | 0.032 |
| B-49 | 17.1 | 8.8 | 0.323 |
| Referential example | 18.5 | 13.3 | 6.3 |

Tables B-7 and B-8 indicate that the object of the present invention can be sufficiently achieved when the halogenation ratio is approximately 10 % or above.
Experiment B-5: Examples B-50 to B-72 Effect of the ratio of halogenated resin to iron powder:

Water was added to 0.1 to 0.5 g of the dry halogenated resin (60- to 100-mesh particles) as prepared in Experiment B-3 to thereby give a moisture content of 50 % in each case. The obtained mixtures were mixed with 0.05 to 0.5 g of electrolytic iron powder and each mixture was packed in an air-permeable bag to thereby give 23 deoxygenating compositions of the present invention (cf. Table B-9)

TABLE B-9

| Deoxygenating composition (Example No.) | Halogenated resin (g; on dry basis) | Electrolytic iron powder (g) |
|---|---|---|
| B-50 | 0.1 | 0.1 |
| B-51 | " | 0.15 |
| B-52 | " | 0.2 |
| B-53 | " | 0.25 |
| B-54 | " | 0.3 |
| B-55 | " | 0.5 |
| B-56 | 0.15 | 0.1 |
| B-57 | " | 0.15 |
| B-58 | " | 0.2 |
| B-59 | " | 0.25 |
| B-60 | " | 0.3 |
| B-61 | " | 0.5 |
| B-62 | 0.2 | 0.1 |
| B-63 | " | 0.15 |
| B-64 | " | 0.2 |
| B-65 | " | 0.25 |
| B-66 | " | 0.3 |
| B-67 | " | 0.5 |
| B-68 | 0.5 | 0.05 |
| B-69 | " | 0.1 |
| B-70 | " | 0.15 |
| B-71 | " | 0.2 |
| B-72 | " | 0.3 |

Each deoxygenating composition thus obtained was subjected to the test of 9 self-reaction expediting type. Table B-10 shows the result.

TABLE B-10

| Test of 9 self-reaction expediting type | | | |
|---|---|---|---|
| Deoxygenating composition | $O_2$ gas concentration (%) | | |
| (Example No.) | after 7 hr | after 24 hr | after 48 hr |
| B-50 | 18.1 | 9.7 | 9.6 |
| B-51 | 10.7 | 4.24 | 4.01 |
| B-52 | 10.2 | 0.007 | 0.003 |
| B-53 | 6.0 | 0.000 | — |
| B-54 | 0.325 | 0.000 | — |
| B-55 | 0.022 | 0.000 | — |
| B-56 | 15.2 | 9.4 | 9.5 |
| B-57 | 12.6 | 2.42 | 2.05 |
| B-58 | 6.4 | 0.000 | 0.000 |
| B-59 | 0.351 | 0.000 | — |
| B-60 | 0.064 | 0.000 | — |
| B-61 | 0.019 | 0.000 | — |
| B-62 | 11.3 | 9.2 | 9.2 |
| B-63 | 10.4 | 5.1 | 5.2 |
| B-64 | 7.3 | 0.000 | 0.000 |
| B-65 | 5.7 | 0.000 | — |
| B-66 | 0.045 | 0.000 | — |
| B-67 | 0.063 | 0.000 | — |
| B-68 | 15.6 | 14.2 | 14.2 |
| B-69 | 9.7 | 8.8 | 8.9 |
| B-70 | 9.8 | 3.73 | 3.76 |
| B-71 | 4.3 | 0.000 | 0.000 |
| B-72 | 0.025 | 0.000 | — |

As shown in Table B-10, 0.2 g of the iron powder was required to remove the oxygen gas in 250 ml of air while 0.15 g of the halogenated resin on a dry basis was required to fully exert the deoxygenating capability of the iron powder. When a less amount (i.e. 0.1 g) of the halogenated resin on a dry basis was employed, a sufficient effect could be obtained by increasing the amount of the iron powder to 0.25 g or above. A deoxygenating agent, which was separately prepared by combining 0.07 g of the halogenated resin of a dry basis with 0.3 g of the iron powder, could completely remove the oxygen gas within 24 hours.

Considering the results of the Examples B-19 to B-39, B-40 to B-44, B-45 to B-49 and B-50 to B-72, the combinations of the halogenated resin with the iron powder each capable of removing the oxygen gas in 250 ml of air may be summarized as follows:

| Halogenated resin (g; on dry basis) | Iron powder (g) |
|---|---|
| 0.15 | 0.20 |
| 0.10 | 0.25 |
| 0.07 | 0.30 |
| 0.05 | 0.50 |
| 0.025 | 0.70 |
| 0.015 | 0.90 |
| 0.010 | 1.0 |
| 0.005 | 1.1 |
| 0.0025 | 1.2 |

Thus it was found that the effect of oxygen gas removal was practically the same among various combinations of the halogenated resin with the iron powder when they were in the range of 0.15~0.010 : 0.20 ~1.0, that the above effect was liable to be lowered progressively when said combinations were in the range of 0.005 : 1.1 or below, and that the combinations in the range of 0.0025 : 1.2 or below had only poor applicability.

The deoxygenating capability of the deoxygenating composition as described in Example B-50 is insufficient to use in a package containing 250 ml of air. However it may be available in one containing about 100 ml of air.

EXPERIMENT B-6: EXAMPLE B-73

One part by weight of the halogenated resin (60- to 100-mesh particles) was mixed with five parts by weight of an electrolytic iron powder. 0.25 g of the obtained mixture was attached to the surface of a self-adhesive tape (Cover-up Tape 658 Post-it; a product of Sumitomo Three M Co., Ltd., 25.4 mm in width and cut into 80 mm in length) and the surface was covered with another self-adhesive tape to thereby give a deoxygenating composition of the present invention.

This deoxygenating composition was subjected to the test of an environmental humidity-depending type, wherein the air content was adjusted to approximately 50 ml. As a result, the oxygen gas was nearly completely removed within 24 hours.

EXPERIMENT B-7: EXAMPLE B-74

A halogenated resin of a halogen content of 3.5 mole/kg was prepared by thoroughly drying IRA-68 at 100° C. and contacting it with hydrogen chloride gas by suction for several seconds with the use of concentrated hydrochloric acid as the source of the hydrogen chloride gas. It seems desirable to employ a cooling system since the above preparation step is tremendously exothermic.

The halogenated resin granules were dressed by passing through 60-mesh and 100-mesh sieves. 0.2 g of the obtained granules were packed in an air-permeable bag together with 0.25 g of an electrolytic iron powder followed by mixing to thereby give a deoxygenating composition of the present invention.

The obtained deoxygenating composition was subjected to the test of an environmental humidity-depending type. As a result, the oxygen gas was completely removed within 54 hours.

EXPERIMENT B-8: EXAMPLE B-75

Effect of environmental humidity:

0.15 g of the dry halogenated resin (100- to 200-mesh particles) as prepared in Experiment B-3 was packed in an air-permeable bag together with 0.4 g of a reduced iron powder followed by mixing to thereby give a deoxygenating composition of the present invention.

The obtained deoxygenating composition was subjected to the test of an environmental humidity-depending type, wherein the environmental humidity in the bag was controlled in the following manner. That is, the tissue paper containing 4 ml of water as described above was replaced by tissue paper, by which 2 g of pottasium dichromate ($K_2Cr_2O_7$), potassium nitrate ($KNO_3$), potassium chloride (KCl), sodium chloride (NaCl) or magnesium nitrate hexahydrate ($Mg(NO_3)_2.6H_2O$) was wrapped and which contained 4 ml of a saturated solution of the corresponding salt. Table B-11 shows the result.

TABLE B-11

| | Effect of environmental humidity | |
|---|---|---|
| Salt | Relative humidity in bag (%)* | $O_2$ concentration (%) after 27 hr |
| (water) | 100 | 0.000 |
| $K_2Cr_2O_7$ | 98.0 | 0.000 |
| $KNO_3$ | 92.4 | 0.000 |
| KCl | 84.2 | 0.000 |
| NaCl | 75.2 | 0.358 |
| $Mg(NO_3)_2 \cdot 6H_2O$ | 52.3 | 16.1 |

*Calculated by multiplying the moisture activity shown by the saturated solution of each salt at 25° C. by 100.

Thus it was found that the deoxygenating composition of Example B-75, which exerted its deoxygenating capability depending on the environmental humidity, exhibited a sufficient effect at a environmental humidity of approximately 80 % or above.

EXPERIMENT B-9

Evolution of hydrogen

Deoxygenating compositions of Examples B-1 to B-9, B-19 to B-25, B-33 to B-39, B-40 to B-44 and B-45 to B-49 were each subjected to the tests of both a self-reaction expediting type and an environmental humidity-depending type and the evolution of hydrogen gas in each bag was examined after 48 hours with a hydrogen gas detecting tube (Gastec ®; mfd by Kitazawa Industry Co., Ltd., detection range: 0.5 to 2.0 %). As a result, no evolution of hydrogen gas was observed in the cases of most of the deoxygenating compositions. Slight color changes of the detecting tube were observed in the cases of a few deoxygenating compositions, though the degree thereof was below the lower detection limit and it was impossible to determine whether it was caused by hydrogen gas or not in each case.

EXPERIMENT B-10

Effect of removing acetaldehyde:

It has been known that a combined use of a known dehydrogenating agent with ethyl alcohol in a packaged food would result in the formation of acetaldehyde. Thus the effects of the deoxygenating compositions of the present invention on the formation of acetaldehyde were examined.

The deoxygenating compositions of Examples B-45 to B-49, i.e., those obtained by Experiment B-4, and a control deoxygenating agent, which was a known one prepared by mixing 100 g of an electrolytic iron powder with 2 ml of a saturated aqueous solution of common salt, drying the obtained mixture in vacuo and packing 2-g portions of the same in air-permeable bags, were subjected to the test of an environmental humidity-depending type wherein the tissue paper containing 4 ml of 25 % ethyl alcohol instead of 4 ml of water and the acetaldehyde in each bag was determined after 24 and 48 hours by gas chromatography.

The acetaldehyde was determined under the condition mentioned above.

Table B-12 shows the result.

TABLE B-12

| Effect of removing acetaldehyde | | | |
|---|---|---|---|
| Deoxygenating compositions (Example No.) | Halogenation ratio (%) | Formed CH₃CHO (relative value) | |
| | | after 24 hr | after 48 hr |
| B-45 | 100 | 0.065 | 0.064 |
| B-46 | 65.8 | undetectable | undetectable |
| B-47 | 31.4 | " | " |
| B-48 | 22.1 | " | " |
| B-49 | 10.1 | " | " |
| Referential example | 5.2 | " | " |
| Control example | — | 0.697 | 0.663 |

As shown in Table B-12, the deoxygenating compositions of Examples B-45 to B-49 and that of the referential example showed each the formation of acetaldehyde in a significantly lower amount than that of the control deoxygenating agent. In particular, no acetaldehyde was observed in those comprising the halogenated resin of a halogenation ratio of 65.8 % or below. This fact might not be caused since no acetaldehyde was formed but since the acetaldehyde once formed was removed by the halogenated resin. Thus it was found that deoxygenating compositions containing the halogenated resin of a halogenation ratio of 10 to 70 % would exhibit a significantly high effect or removing acetaldehyde.

EXPERIMENT B-11: APPLICATION EXAMPLE B-1

Packaged raw Chinese noodles:

120 g of raw Chinese noodles produced in a conventional manner were packed in a KOP bag together with the deoxygenating composition of Example B-22, B-30 or B-58 and the bag was hermetically sealed in such a manner as to contain approximately 250 ml of air.

The raw Chinese noodles in each bag were preserved at 20 ° C. for 24 hours and the oxygen gas concentration in the air in the bag was determined. As a result, the oxygen concentration of every case was 0.000 %.

EXPERIMENT B-12: APPLICATION EXAMPLE B-2

Two pieces of commercially available sponge cake weighing approximately 100 g were packed in a KOP bag together with the deoxygenating composition of Example 51 or 52 and the bag was hermetically sealed in such a manner as to contain approximately 100 ml of air.

The sponge cake in each bag was preserved at 10 ° C. and the oxygen concentration in the air in the bag was determined after 24 hours. As a result, the oxygen gas concentration in every case was 0.000 %.

EXPERIMENT B-13: APPLICATION EXAMPLE B-'

50 g of a commercially available smoked cuttlefish was packed in a KOP together with the deoxygenating composition of Example B-47, B-048 or B-49 and the bag was hermetically sealed in such a manner as to contain approximately 100 ml of air.

The smoked cuttlefish in each bag was preserved at 20 ° C. and the oxygen gas concentration in the air in the bag was determined after 24 hours. As a result, the oxygen gas concentration in each case was 0.000 %.

EXAMPLE B-76

700 parts by weight of a reduced iron powder (-mesh) was homogeneously mixed with 30 parts by weight of a halogenated weakly basic anion exchange resin (Sumica Ion; a product of Sumitomo Chemical Co., Ltd.). Approximately 0.8 g of the mixture thus obtained was packed in an air-permeable polyethylene bag to thereby give a deoxygenating composition of the present invention. This product exhibited an excellent deoxygenating capability practically similar to that of a conventional deoxygenating agent containing approximately 2 g of a reduced iron powder.

Approximately 1 g of a mixture, which was obtained by further adding 40 parts by weight of a free-type weakly basic anion exchange resin (Sumica Ion) to the above-mentioned mixture, was packed in an air-permeable bag to thereby give a deoxygenating composition of the present invention.

The above description obviously indicates that the deoxygenating composition of the present invention has various advantages in that it is not accompanied by any trouble of food contamination since it required no water-soluble material; that it can be readily rendered a self-reaction expediting or environmental humidity-depending type; and that it exhibits a high deoxygenating effect even in a compact form. For example, the contents of commercially available de oxygenating agents available for 250 ml of air weighed 1.76 g, 2.79 g and 4.39 g. In contrast thereto, the deoxygenating compositions of Examples B-19, B-25 and B-53 weighed 0.45 g, 0.75 g and 0.45 g, respectively, i.e., extremely lighter than the former.

Among the deoxygenating compositions of the present invention, those containing halogenated weakly basic anion exchange resins exhibit excellent effects of removing acetaldehyde in addition to the deoxygenating effects.

Similar to known ones, the deoxygenating compositions of the present invention would generate heat as the deoxygenating reaction proceeds. Thus they are available as heaters or heat insulators.

The completion of the present invention makes it possible to provide a deoxygenating composition having excellent properties which have never been observed in conventional ones. It is believed that the deoxygenating composition of the present invention will be widely employed in order to, for example, maintain the qualities of food.

Now polyamino acids or polymers comprising amino sugar(s) used as the compounds having amino group(s) (b) will be described in more detail.

The amine portions of these polyamino acids or polymers may be in a free form. Alternately some or all of the same may be in the form of a salt with an organic or inorganic acid, e.g., acetate or hydrochloride. When a deoxygenating material of an untreated surface, e.g., a reduced iron powder, is employed, it is desirable to use a polyamino acid or a polymer wherein some or all of the amine portion is in the form of a salt obtained by treating with an acid to thereby enhance the deoxygenating capability. The polyamino acids and polymers may be either in a dry or moistened state.

A deoxygenating component comprising an iron compound and a polyamino acid or a polymer having amino group(s) may be used in a proportion of 0.2 parts by weight or above, preferably 1 to 20 parts by weight, of the latter on a dry basis based on 100 parts by weight of the former. The deoxygenating iron compound and the polyamino acid or the polymer may be used in amounts of 70 to 99.8 % by weight, preferably 80 to 90 % by weight and 0.2 to 30 % by weight, preferably 1 to 20 % by weight, based on the whole deoxygenating composition of the present invention.

The deoxygenating composition of the present invention may be prepared by, for example, the following method. A deoxygenating component comprising an iron compound is mixed with a polyamino acid or a polymer comprising amino sugar(s) and the obtained mixture is packed in an air-permeable bag. The deoxygenating composition of the present invention may further contain filler(s) such as silica gel.

EXPERIMENT C-1

Sample

The deoxygenating compositions prepared in Examples C-1 and C-2 were referred to as samples of the present invention 1 and 2, respectively, while those prepared without using poly-L-lysine nor chitosan in Examples C-1 and C-2, respectively, were employed as control samples.

Method

Each sample was packed in a bag, on which oxygenimpermeable nylon was laminated, together with a commercially available ethyl alcohol slow releasing agent (a product of Nippon Kayaku Co., Ltd., Silica containing 0.63 g of ethyl alcohol) and absorbent cotton impregnated with 4 ml of water and then the bag was hermetically sealed in such a manner as to contain approximately 300 cc of air. After preserving the package at room temperature for a given period, acetaldehyde in the bag was determined by gas chromatography while the oxygen concentration was determined with an oxygen meter.

Result

Table C-1 shows the result. Since the amount of acetaldehyde can hardly expressed in an absolute value, it is expressed in a relative value determined by allotting a value of 100 to the amount of acetaldehyde in the bag containing the control samples.

TABLE C-1

| Sample | Acetaldehyde | | | O₂ concentration | | |
|---|---|---|---|---|---|---|
| | after 3 days | after 5 days | after 21 days | after 3 days | after 5 days | after 21 days |
| 1 | — | — | 3 | — | — | 0 |
| 2 | 25.0 | 21.1 | — | 0 | 0 | — |
| Control | 100 | 100 | 100 | 0 | 0 | 0 |

The above table obviously indicates that the amount of acetaldehyde in a container was significantly lowered by using the deoxygenating compositions of the present invention compared with the control case. Therefore the deoxygenating compositions of the present invention are suitable for employing together with an alcoholic food preservative in preserving, in particular, food.

To illustrate a process for preparing the deoxygenating composition of the present invention, the following Examples will be given.

EXAMPLE C-1

100 g of an electrolytic iron powder was blended with 2 ml of a saturated aqueous solution of common salt and the obtained mixture was dried in vacuo. 3 g of the mixture was hoomogenously mixed with 0.084 g of dried poly-L-lysine of 10,000 in average molecular weight and 150-mesh in grain size. The mixture thus obtained was packed in a paper bag (4 cm × 7 cm) on which a porous polyethylene film was laminated. Thus a deoxygenating composition of the present invention was obtained.

EXAMPLE C-2

The procedure of Example C-1 was followed except that the poly-L-lysine was replaced by 0.3 g of dried chitosan to thereby give a deoxygenating composition of the present invention.

Now a deoxygenating composition including a chelated basic anion exchange resin, which will be referred to as a metal-chelated resin hereinafter, and an iron powder will be described.

What is claimed is:

1. A process for preserving food which comprises packing the food in a hermetically sealed container together with: a deoxygenating composition including
    (a) at least one deoxygenating material selected from a group consisting of a substantially non-oxidated iron powder and a ferrous compound; and
    1 (b) a weakly basic anion exchange resin substituted by a halogen ion
in such a manner that they are not in direct contact with the food.

2. A process as set forth in claim 1, wherein the deoxygenating composition comprises
    (a) at least one deoxygenating material selected from a group consisting of a substantially non-oxidized iron powder and a ferrous compound;
    (b) a weakly basic anion exchange resin substituted by a halogen ion; and
    (c) at least one material selected from a group consisting of a filler and a weakly basic anion exchange resin unsubstituted by a halogen ion
in such a manner that they are not in direct contact with the food.

3. A deoxygenating composition which includes:
    (a) a deoxygenating material which is at least one material selected from among a substantially non-oxidized iron powder and a ferrous compound; and
    (b) a weakly basic anion exchange resin substituted by a halogen ion.

4. A composition as set forth in claim 3, which includes: (a) ten parts by weight of said deoxygenating material; and (b) approximately 0.2 to 500 parts by weight of said weakly basic anion exchange resin.

5. A deoxygenating composition which includes (a) ten parts by weight of an iron powder; and (b) approximately 0.03 to approximately 100 parts by weight of a basic anion exchange resin substituted by a halogen ion.

6. A deoxygenating composition which includes: (a) ten parts by weight of an iron powder; and (b) 0.03 to 50 parts by weight of a weakly basic anion exchange resin substituted by a halogen ion.

7. A deoxygenating composition which includes (a) at least one deoxygenating material selected from a group consisting of a substantially non-oxidized iron powder and a ferrous compound.
(b) a weakly basic anion exchange resin substituted by a halogen ion in such a manner that they are not in direct contact with the food and
(c) at least one material selected from a group consisting of a filler and a weakly basic anion exchange resin unsubstituted by a halogen.

8. A deoxygenating composition which includes: (a) ten parts by weight of an iron powder; (b) 0.03 to 50 parts by weight of a weakly basic anion exchange resin; and (c) 0.03 to 50 parts by weight of a weakly basic anion exchange resin substituted by a halogen ion.

* * * * *